June 28, 1927.
H. FORD
1,633,890
STEERING GEAR REDUCTION
Filed June 1, 1926
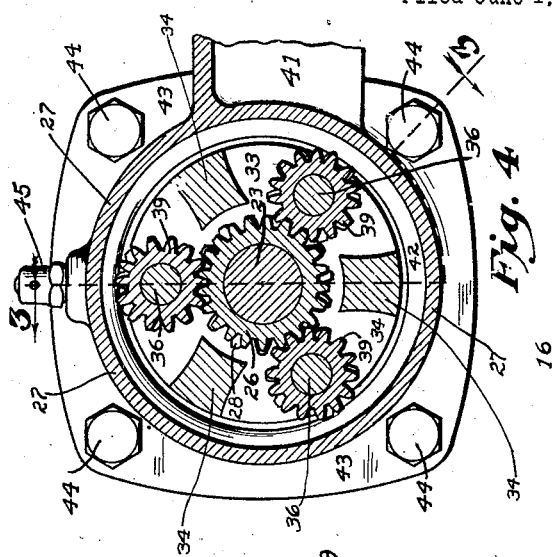
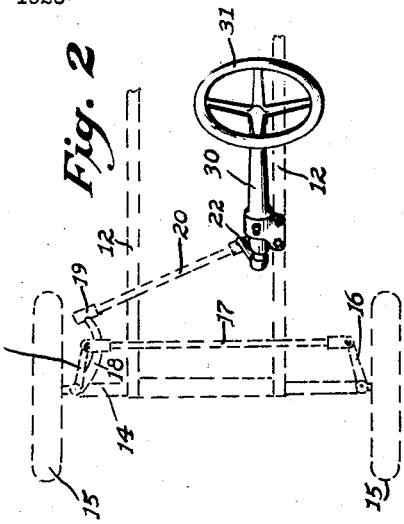
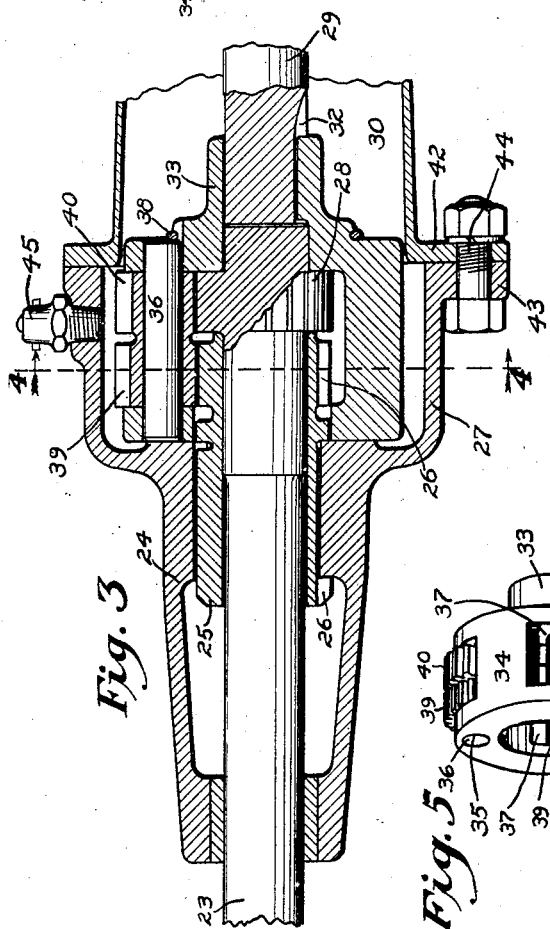
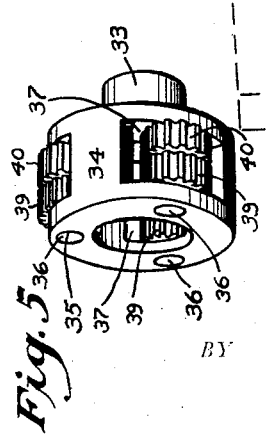
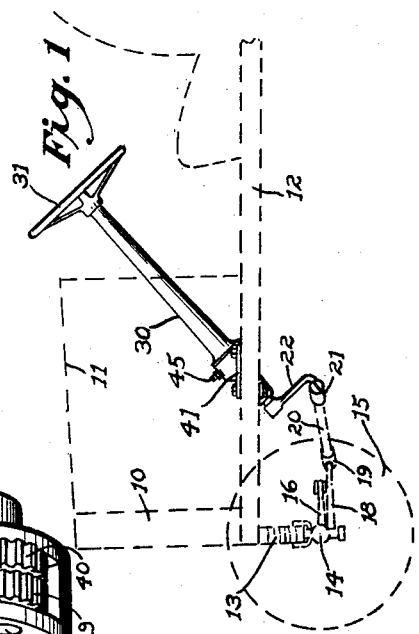
INVENTOR
Henry Ford
BY
ATTORNEY Patented June 28, 1927.

1,633,890

UNITED STATES PATENT OFFICE.

HENRY FORD, OF DEARBORN, MICHIGAN.

STEERING-GEAR REDUCTION.

Application filed June 1, 1926. Serial No. 112,763.

The object of my invention is to provide improvements in a steering gear reduction of simple, durable and inexpensive construction.

A further object of my invention is to provide a compact reduction gear which may be conveniently disposed at the upper end of the steering gear column or at the lower end thereof adjacent to the fastening of the column to the vehicle frame and which will provide a relatively high reduction with a comparatively small number of parts which are compactly arranged.

Still a further object of my invention is to provide a steering gear reduction which takes advantage of the well known principle of the planetary or epicycloidal type to secure the desired reduction in a compact form.

With these and other objects in view my invention consists in the arrangement, construction, and combination of the various parts of my improved steering gear reduction as described in the specification, claimed in my claims, and disclosed in the accompanying drawings, in which:

Figure (1), shows a side elevation of a steering gear reduction with the parts associated therewith illustrated in dotted lines in order to show the connection of such parts with the steering gear reduction.

Figure (2), shows a top or plan view of a portion of the parts shown in Figure (1).

Figure (3), shows a vertical, central, longitudinal, sectional, and enlarged view, taken on the line 3—3 of Figure (4), of the reduction gearing proper and its housing.

Figure (4), shows a transverse sectional view, taken on the line 4—4, of Figure (3), and Figure (5), shows a perspective view of the planetary spider and the gears therein which are used in connection with my improved steering gear reduction.

Referring to the accompanying drawings, I have used the reference numeral (10) to indicate generally the radiator of a motor vehicle having hood (11), both of these parts being mounted on the frame members (12). The frame is carried by springs (13), which, in turn, are secured to an axle (14), which, in turn, is mounted on wheels (15). These wheels (15) are mounted on spindles having steering arms (16), which are connected by a tie rod (17), whereby the wheels may be moved on the spindles to steer the vehicle. A steering arm (18) is mounted on one of the spindles and extends rearwardly to position where it is connected by a universal joint (19) to a drag link (20), which, in turn, is connected by the universal joint (21) to the steering arm (22). This steering arm (22) is fixed to a shaft (23) which extends into the steering gear reduction housing (24). A sleeve (25) is fixed in the housing (24) adjacent to the upper end of the shaft (23) in any suitable manner, as by means of splines (26). At the upper end of the fixed sleeve (25) gear teeth (26) are formed, which are disposed in the housing (24) within an enlargement (27) thereof and just below the end of the shaft (23). A second gear (28) is formed at the upper end of the shaft (23) and in the form of the device here shown is integral with the shaft (23). It may, however, be formed separately and secured to the end of that shaft if desired. It will be noted that the shaft (23) is journalled in the sleeve (25).

A shaft (29), which is designed to be rotatably mounted in the steering column housing (30), has its upper end fixed to a steering wheel (31). The lower end of the shaft (29) is splined as at (32) and is received in a correspondingly splined opening in a sleeve (33), which extends upwardly from a planetary spider (34). This spider (34) is generally of cylindrical shape and provided with a plurality of spaced parallel pairs of aligned openings (35) designed to receive pins (36), upon which the planetary gears may be rotatably mounted in recesses (37) in the spinder (34). By referring to Figure (3) it will be noted that the lower ends of these pins (36) rest on the shoulder formed at the bottom of the enlarged portion (27) of the housing (24) so that they cannot slide downwardly out of the spider when the spider is in place in the housing. An annular groove is formed in the planetary spider (34) adjacent to the base of the sleeve (33) thereof and in such position that a resilient ring (38) may be partially received within this annular groove and in such position that portions of the ring will extend across each of the openings (35) to thereby prevent the pins (36) from slipping out of the planetary spider (34) upwardly.

The planetary gears, which are mounted in the recesses (37) of the planetary spider (34) in the form of device here illustrated, consist of three pairs of gears, the gears of each pair being fixed from rotation from each other as by being made integral.

These gears in the device illustrated are arranged so that the upper gears of each pair have 11 teeth and the lower gears of each pair have 12 teeth. I have given the reference numeral (39) to the lower gear and (40) to the upper gear. These gears mesh with the gears (26) and (28), which have heretofore been described so that the gears (40) mesh with the gear (28) and gears (39) mesh with the gear (26). These gears (26) and (28) each have 21 teeth.

This arrangement of gearing, together with the number of teeth upon the various gears here illustrated, serves to give a 12 to 1 reduction between the speed of the driving shaft (29) as compared with the driven shaft (23).

It is understood that the number of teeth which are here illustrated and described are merely used to illustrate the construction and arrangement of the parts of my invention, and I do not desire to limit myself to the particular number of teeth shown or the reduction secured thereby.

From the foregoing it will be seen that the rotation of the shaft (29) by the steering wheel (31) will rotate the planetary spider (34) thereby carrying around the pins (36) and the planetary gears mounted thereon. As the gear (26) is fixed it will be seen that rotation of the planetary spider (34) will impart rotation to the planetary gears upon the pins (36). Due to the difference in the number of the teeth on the gear (26) and gears (39), as compared with the number of teeth on the gear (28) and gears (40), it will be seen that rotation will be imparted to the shaft (23) at one-twelfth the speed of the rotation of shaft (29).

Suitable means, such as a bracket (41), may be cast integral with the housing (24) for the purpose of forming flanges, which may be bolted to the frame members (12) to support the gear housing. The steering column housing (30) is provided with flanges (42), which are designed to coact with flanges (43) formed on the enlargement (27) so that bolts (44) may be applied to secure the housing (24) to the housing (30), thereby forming a dust and grease tight container for the gearing which has been described. A grease fitting (45) of well known construction may be tapped into the enlargement (27) of the housing (24) for the purpose of forcing lubricant into the housing and gear therein.

It will be noted that the shaft (23) extends beyond the gear (28) and into the interior of the planetary spider (34) so that a bearing therefor may be formed in this spider and so that the shaft (23) with the shaft (29) and the planetary gearing may form a substantially unitary structure when assembled.

Among the many advantages arising from the use of my improved steering gear reduction which should be specifically pointed out is that the gearing gives a very high reduction ratio, but at the same time may be housed in a relatively small housing. The gear itself is also relatively efficient and the lost motion due to wear is greatly minimized by the fact that there are three sets of gear teeth to carry the steering impulses and receive the road shocks, so that the effects of wear on the reduction gearing are largely eliminated. I am, therefore, able to provide a gearing which gives a desired reduction in the smallest possible space and which requires substantially no adjustment, and which may be readily assembled.

Some changes may be made in the arrangement and construction of the various parts of my improved device without departing from the spirit of my invention, and it is my intention to cover by the following claims such changes as may be reasonably included in the scope thereof.

I claim as my invention:

1. In a steering gear reduction device, a two part housing having a gear housing portion and a steering column portion, the gear housing portion having an enlargement at the upper end thereof, a sleeve fixed in said gear housing and having a stationary gear at the inner end thereof, a driven shaft extended through said sleeve into the gear housing and having a gear formed at the inner end thereof, a driving shaft extended into said housing, a planetary spider of generally cylindrical shape having spaced recesses in its walls and pairs of aligned parallel openings adjacent to said recesses, said spider also having a sleeve extended from one end thereof and a groove adjacent to said sleeve, means for securing the driving shaft in the sleeve, pins mounted in said pairs of openings, resilient means mounted in the groove to lock said pins in the spider, and pairs of planetary gears mounted in said recesses on said pins in position to coact with the stationary gear and said second gear to impart rotation from the driving to the driven shaft.

2. In a steering gear reduction device, a housing, a gear fixed in said housing, a second gear concentric with the first gear and rotatably mounted in said housing, a planetary spider of generally cylindrical shape having spaced recesses in its walls and pairs of aligned parallel openings adjacent to said recesses, said spider having a groove therein, means for rotating said spider, pins mounted in said pairs of openings, resilient means mounted in the groove to lock said pins in the spider, and pairs of planetary gears mounted in said recesses on said pins in position to coact with the fixed gear and said second gear to impart rotation from the spider to the second gear.

Signed at the city of Dearborn, county of Wayne, State of Michigan, this 25 day of May 1926.

HENRY FORD.